Patented May 20, 1930

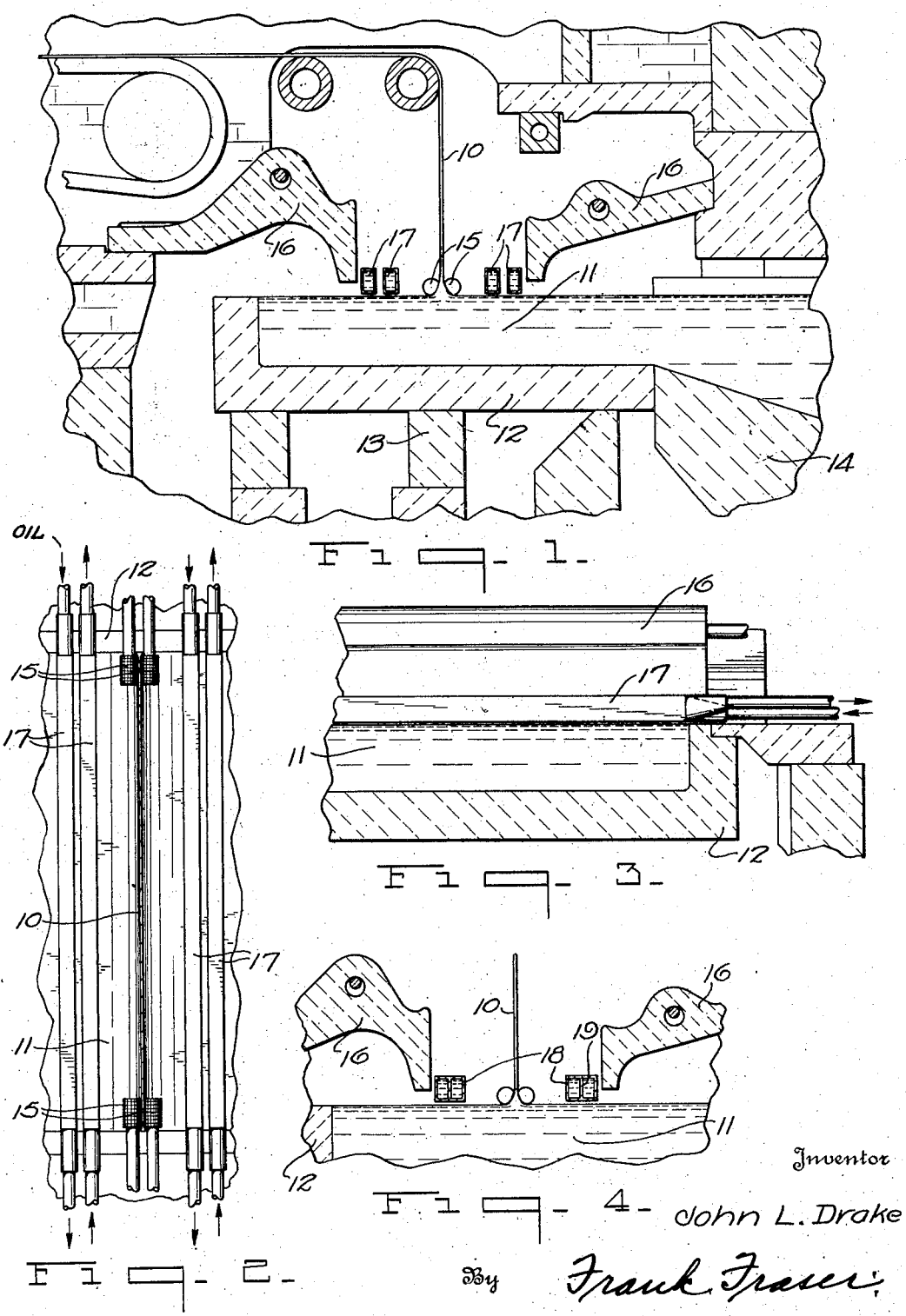

1,759,226

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

METHOD OF OPERATING SHEET-GLASS COOLERS

Application filed October 4, 1926. Serial No. 139,289.

The present invention relates to sheet glass apparatus.

An important object of the invention is to provide in sheet glass apparatus an improved form of heat absorbing means.

Another object of the invention is to provide a cooler means of this nature including a plurality of channels through which independent flows of cooling mediums may be circulated.

Another object of the invention is to provide in sheet glass apparatus a cooler comprising a plurality of compartments, and means for circulating a cooling medium through said compartments, the flow of such medium in one compartment being in a direction opposite to a similar flow in another compartment.

Still another object of the invention is to provide in sheet glass apparatus heat absorbing means comprising a plurality of compartments arranged transversely of the flow of glass, and means for passing a cooling medium through the said cooler in opposite directions so that the combined effect of the flows will give a uniform treatment to the glass thereunder.

Still another object is to provide means whereby oil may be used as a cooling medium in sheet glass apparatus.

A further object is to provide heat absorbing means so designed that oppositely flowing streams of oil may be disposed near a mass of molten glass for uniformly absorbing heat therefrom.

A further and important object is to provide in sheet glass a cooling medium that can be heated in excess of 212° F. and not steam.

A further object is to provide in sheet glass apparatus a heat absorbing member including a plurality of channels through which oppositely moving streams of oil may be passed, said oil being such that the temperature thereof can be raised in excess of 212° F. without an increase in pressure.

Other objects and advantages of the invention will become apparent during the course of the following description.

In the drawings wherein like numerals are employed to designate like parts throughout the same, Fig. 1 is a vertical longitudinal section through a sheet glass drawing machine illustrating one form of my invention in use, Fig. 2 is a fragmentary plan view thereof, Fig. 3 is a fragmentary elevation of the same construction, and Fig. 4 is a sectional detail of a slightly modified form of cooler.

The type of machine illustrated in the drawings is similar to that disclosed in the Colburn Patent 1,248,809, wherein a sheet of glass 10 is continuously drawn from a mass of molten glass 11 contained in a suitable receptacle or draw pot 12 supported on the stools 13 and being arranged in open communication with a tank furnace 14, and from which it is continuously supplied. Edge engaging means 15 are provided to prevent narrowing of the sheet.

Arranged over the molten glass in the draw pot are lip-tiles 16, the tiles being arranged in spaced relation and between which the sheet 10 is formed. As set forth in the Colburn patent, and as used in the prior art, it has been customary to arrange a heat absorbing member adjacent each of the lip-tiles 16. These heat absorbing members have been in the past rectangular, and adapted for a single flow of a cooling medium. The cooling medium therefore has all been introduced from the same side of the cooler. Obviously, the greatest cooling action is had at the intake of the cooler, while the effect of the cooling medium becomes progressively less from the intake end toward the outlet end. Of course the invention is not necessarily limited for use in connection with the Colburn type of machine.

It is therefore an aim of the present invention to provide heat absorbing or cooling means adapted for use in connection with a sheet glass machine wherein a substantially uniform absorption of heat takes place.

In carrying out this end, each heat absorbing unit comprises a plurality of conduits or channels 17 as clearly shown in Fig. 1. The conduits or cooler members may be arranged in spaced relation, and as illustrated in Fig.

1, two such conduits comprise a single unit, although of course four or more may be used as desired. Fig. 2 illustrates diagrammatically the path or direction of flow of the cooling mediums. To obtain a uniform action the cooling medium is introduced at both sides of the pot simultaneously so that where two conduits are used in a single unit the flow of water or other cooling medium in one of the channels will be in a direction opposite to the flow in the other of said channels. Thus, in one channel the intake end of the cooler for the cooling medium will be to the left of the pot, while in the adjacent channel the intake end will be at the right of the pot. It will thus be seen that the combined effect of the two channels will be uniform throughout the entire width of the pot or the entire length of the coolers. In Fig. 4, the cooler 18 comprises a single casing, being divided into separate compartments by means of a partition 19.

It has been customary in the past to employ cold water as a cooling medium, and this medium can be used in the present cooler means. I prefer to use an oil or similar liquid. Cold water has a tendency to cause sweating on the exterior of the cooler when passed therethrough, while at the same time there is the possibility of the formation of steam on the cooler. Oil can be used without either of these troubles. Furthermore, there are often times when it is desirable to permit the cooling medium to raise in temperature above 212° F. so that the heat absorption will be less. With water as a cooling medium this is not safe as the coolers are apt to blow up due to an increase in pressure. Therefore, I prefer to use an oil as a cooling medium so that when the occasion demands the temperature of the cooling medium can be raised above the limit heretofore set by the use of water. This will permit a more accurate and satisfactory conditioning of the glass.

One of the reasons that water coolers sweat is that the waters on the interior of the cooler and consequently the exterior surface of said cooler, is usually kept at a temperature sufficiently cold that moisture in the air will condense thereon. With the use of oil, the exterior surface of the cooler can be kept at a temperature in excess of that temperature at which water will condense. Oil can be heated above 212° F. in a cooler without increasing the pressure therein. Furthermore, oil will not permit scaling of the cooler, nor will there be an accumulation of sediment, etc. as there is when water is used.

Claims:

1. The process of absorbing heat from a mass or molten glass or from a newly formed glass sheet consisting in passing a stream of oil through a metallic casing in proximity thereto but out of contact therewith, and in maintaining the temperature of the oil in excess of 212° Fahrenheit.

2. The process of absorbing heat from a newly formed sheet of glass, which consists in passing separate streams of oil through metallic casings located at one side of the sheet adjacent to but out of contact therewith, and in maintaining the temperature of the oil in each casing in excess of 212° Fahrenheit.

3. The process of absorbing heat from a newly formed sheet of glass, which consists in passing separate streams of oil in opposite directions through metallic casings located at one side of the sheet adjacent thereto but out of contact therewith, and in maintaining the temperature of the oil in excess of 212° Fahrenheit.

4. The process of absorbing heat from a mass of molten glass or from a newly formed glass sheet, which consists in passing a stream of liquid through a metallic casing located adjacent thereto but out of contact therewith, and in maintaining the temperature of the liquid in said casing in excess of 212° Fahrenheit.

5. The process of absorbing heat from a mass of molten glass or from a newly formed glass sheet, which consists in passing separate streams of liquid in opposite directions through metallic casings located adjacent thereto but out of contact therewith, and in maintaining the temperature of the liquid in the casing in excess of 212° Fahrenheit.

6. The process of absorbing heat from a mass of molten glass or from a newly formed glass sheet, which consists in passing separate streams of oil in opposite directions through metallic casings located adjacent thereto but out of contact therewith, and in maintaining the temperature of the oil in the casings in excess of 212° Fahrenheit.

Signed at Toledo, in the county of Lucas and State of Ohio, this 30th day of September, 1926.

JOHN L. DRAKE.